United States Patent [19]

Tilston et al.

[11] Patent Number: 5,665,818
[45] Date of Patent: Sep. 9, 1997

[54] HIGH ACTIVITY STAGED REACTOR PROCESS

[75] Inventors: Michael William Tilston, St. Albans; Thomas Edward Spriggs, Cross Lane, both of W. Va.

[73] Assignee: Union Carbide Chemicals & Plastics Technology Corporation, Danbury, Conn.

[21] Appl. No.: 609,595

[22] Filed: Mar. 5, 1996

[51] Int. Cl.$^6$ ........................................................ C08F 2/34
[52] U.S. Cl. ............................ 525/53; 525/54; 525/247; 525/268; 526/65; 526/68; 526/88
[58] Field of Search ........................... 525/53, 54, 247, 525/268; 526/65, 68, 88

[56] References Cited

U.S. PATENT DOCUMENTS

| | | | |
|---|---|---|---|
| 4,065,609 | 12/1977 | Willmore | 526/61 |
| 4,703,094 | 10/1987 | Raufast | 526/65 |
| 4,981,929 | 1/1991 | Hussein et al. | 526/125 |
| 5,026,798 | 6/1991 | Canich | 526/127 |
| 5,047,468 | 9/1991 | Lee et al. | 525/53 |
| 5,272,236 | 12/1993 | Lai et al. | 526/348.5 |
| 5,405,901 | 4/1995 | Daniell et al. | 525/53 |
| 5,405,922 | 4/1995 | DeChellis et al. | 526/68 |

Primary Examiner—Romulo H. Delmendo
Attorney, Agent, or Firm—Saul R. Bresch

[57] ABSTRACT

A process comprising contacting ethylene and at least one alpha-olefin comonomer having 3 to 8 carbon atoms with a transition metal based catalyst system in two fluidized bed reactors connected in series, in the gas phase, under polymerization conditions, with the provisos that:

(a) the first reactor is operated at a temperature at or above the dew point of the mixture of monomers, but no higher than about 5 degrees C. above said dew point;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) in the reactor in which a low melt index copolymer is made:
   (1) the alpha-olefin is present in a ratio of about 0.01 to about 0.4 mol of alpha-olefin per mol of ethylene; and
   (2) optionally, hydrogen is present in a ratio of about 0.001 to about 0.3 mol of hydrogen per mol of ethylene; and (e) in the reactor in which a high melt index polymer is made:
   (1) optionally, alpha-olefin is present in a ratio of about 0.005 to about 0.6 mol of alpha-olefin per mol of ethylene; and
   (2) optionally, hydrogen is present in a ratio of about 0.001 to about 3 mols of hydrogen per mol of ethylene.

9 Claims, No Drawings

HIGH ACTIVITY STAGED REACTOR PROCESS

TECHNICAL FIELD

This invention relates to a process for preparing an in situ polyethylene blend in which high activity in the second of two staged reactors is achieved.

BACKGROUND INFORMATION

There has been a rapid growth in the market for linear low density polyethylene (LLDPE), particularly resin made under mild operating conditions; typically at pressures of 100 to 400 psi and reaction temperatures of less than 120° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and mount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
  (1) the alpha-olefin is present in a ratio of about 0.02 to about 3.5 moles of alpha olefin per mole of ethylene; and
  (2) hydrogen is present in a ratio of about 0.05 to about 3 moles of hydrogen per mole of combined ethylene and alpha-olefin;

(d) in the low melt index reactor:
  (1) the alpha-olefin is present in a ratio of about 0.02 to about 3.5 moles of alpha-olefin per mole of ethylene; and
  (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, industry is continuously striving to increase catalyst productivity.

DISCLOSURE OF THE INVENTION

An object of this invention, therefore, is to provide a process for preparing an in situ blend in which catalyst productivity is substantially increased over prior art in situ processes. Other objects and advantages will become apparent hereinafter.

According to the present invention such a process has been discovered. The process comprises contacting ethylene and at least one alpha-olefin comonomer having 3 to 8 carbon atoms with a transition metal based catalyst system in two fluidized bed reactors connected in series, in the gas phase, under polymerization conditions, with the provisos that:

(a) the first reactor is operated at a temperature at or above the dew point of the recycle gas, but no higher than about 5 degrees C. above said dew point;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) in the reactor in which a low melt index copolymer is made:
  (1) the alpha-olefin is present in a ratio of about 0.01 to about 0.4 mol of alpha-olefin per mol of ethylene; and
  (2) optionally, hydrogen is present in a ratio of about 0.001 to about 0.3 mol of hydrogen per mol of ethylene; and (e) in the reactor in which a high melt index copolymer is made:

(1) optionally, alpha-olefin is present in a ratio of about 0.005 to about 0.6 mol of alpha-olefin per mol of ethylene; and (2) optionally, hydrogen is present in a ratio of about 0.2 to about 3 mols of hydrogen per mol of ethylene.

DESCRIPTION OF THE PREFERRED EMBODIMENT(S)

As noted, the blend is produced in two staged reactors connected in series wherein a mixture of resin and active catalyst is transferred from the first reactor to the second reactor in which another polymer is prepared and blends in situ with the copolymer from the first reactor.

The first reactor is operated at a temperature at or above the dew point of the recycle gas introduced into the first reactor, but no higher than about 5 degrees C. above the dew point. The recycle gas is defined as a mixture of gases including ethylene and one or more alpha-olefins having 3 to 8 carbon atoms, preferably one or two alpha-olefins, as comonomers (alpha-olefin is required in the first reactor recycle gas and is optional in the second reactor recycle gas), and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The recycle gas can also be referred to as the inlet gas or cycle gas.

The dew point is defined as the temperature at which the recycle gas begins to condense. It is desirable to run the first reactor at a temperature in the range of about 60 to about 100 degrees C., and preferably in the range of about 70 to about 90 degrees C. Addition of inert hydrocarbons to the recycle gas in prescribed concentrations can decrease the difference between the dew point of the recycle gas and the reactor temperature. Examples of such inert hydrocarbons are isopentane, hexane, ethane, propane, octane butane, and decane. The relatively higher molecular weight hydrocarbons such as isopentane and hexane are preferred. The amount of inert hydrocarbons introduced into the first reactor can be in a range of up to about 30 mol percent based upon the number of mols in the mixture of monomers in the reactor, and is preferably in the range of about 2 to about 25 mol percent. It should be pointed out that nitrogen, hydrogen, and the like have very little effect on the dew point. Other inert materials, which increase the dew point of the mixture of monomers, can also be used. While it is preferred to increase the dew point, the reactor temperature can be brought closer to the dew point simply by lowering the reactor temperature.

Preferred comonomer combinations are:

| first reactor | second reactor |
| --- | --- |
| 1-hexene | 1-hexene |
| 1-butene | 1-hexene |
| 1-butene | 1-butene |
| 1-hexene | 1-butene |

The 1-hexene/1-hexene combination is found to give the best film properties. It is noted that an ethylene homopolymer can be made in the second reactor, if desired.

It will be understood that generally the in situ blend can be characterized as a bimodal resin. In some cases, however, the two components making up the blend are sufficiently close in average molecular weight that there is no discernible discontinuity in the molecular weight curve.

The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

In the process of this invention, it is unexpectedly found that operating at the dew point of the recycle gas introduced into the first reactor or at a temperature no greater than about 5 degrees C. above the dew point of the recycle gas results in a substantial increase in catalyst productivity in the second reactor. This is so even though the second reactor is operated under conditions where the second reactor temperature is far removed from the recycle gas dew point, for example, at temperatures in the range of about 30 to about 80 degrees C. above the dew point of the recycle gas.

Transition metal catalyst systems can be exemplified by the magnesium/titanium catalyst system described in U.S. Pat. No. 4,302,565. In addition to the gas phase, the resins referred to in this specification can also be produced in a slurry or solution phase. The precursor can be supported or unsupported. Another catalyst system is one where the precursor is formed by spray drying and used in slurry form. Such a catalyst precursor, for example, contains titanium, magnesium, and an electron donor, and, optionally, an aluminum halide. The precursor is then introduced into a hydrocarbon medium such as mineral oil to provide the slurry form. This is described in U.S. Pat. No. 5,290,745. Further, the catalyst system can be a vanadium based catalyst system such as that described in U.S. Pat. No. 4,508,842; a chromium based catalyst system such as that described in U.S. Pat. No. 4,101,445; or other transition metal catalyst systems useful in the preparation of polyolefins such as polyethylene and polypropylene. Many of these catalyst systems are often referred to as Ziegler-Natta catalyst systems. Catalyst systems, which use chromium or molybdenum oxides on silica-alumina supports, are also useful. The preferred catalyst systems are magnesium/titanium and metallocene catalyst systems. Examples of metallocene catalyst systems can be found in U.S. Pat. Nos. 5,194,532; 5,227,440; 5,279,999; and 5,317,036; U.S. patent application Ser. No. 08/412,964 filed on Mar. 29, 1995; and European patent application 595,390.

With respect to typical magnesium/titanium based catalyst systems:

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atom or OCR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

A typical example of a metallocene based catalyst system, which includes a precursor and an aluminoxane cocatalyst, is exemplified as follows:

The precursor can have the following formula:

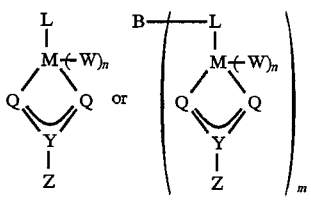

wherein:

M is Zr or Hf;

L is a substituted or unsubstituted, π-bonded ligand;

Q can be the same or different and is independently selected from the group consisting of —O—, —NR—, —CR$_2$— and —S—;

Y is either C or S;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ or —H;

n is 1 or 2;

W is a univalent anionic group when n is 2 or W is a divalent anionic group when n is 1;

R can be the same or different and is independently a group containing carbon, silicon, nitrogen, oxygen, and/or phosphorus and one or more R groups may optionally be attached to the L substituent;

B is a bridging group selected from the group consisting of an alkylene or arylene group containing from 1 to 10 carbon atoms; germanium; silicone; and alkyl phosphine; and m is 1 to 7.

Examples of the aluminoxane cocatalyst are methylaluminoxane (MAO) and modified methylaluminoxane (MMAO).

With regard to transition metal catalyst systems in general:

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is usually prepared in the first reactor. The mixture of polymer and an active catalyst is usually transferred from the first reactor to the second reactor via an interconnecting device using nitrogen or second reactor recycle gas as a transfer medium. Alternatively, the low molecular weight copolymer can be prepared in the first reactor and the high molecular weight copolymer can be prepared in the second reactor.

In the high molecular weight reactor:

Because of the low values, instead of melt index, flow index is determined and those values are used in this specification. The flow index can be in the range of about 0.01 to about 50 grams per 10 minutes, and is preferably in the range of about 0.2 to about 12 grams per 10 minutes. The molecular weight of this polymer is, generally, in the range of about 135,000 to about 445,000. The density of the copolymer can be at least 0.860 gram per cubic centimeter, and is preferably in the range of 0.890 to 0.940 gram per cubic centimeter. The melt flow ratio of the polymer can be in the range of about 12 to about 70, and is preferably about 14 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 0.5 to about 3000 grams per 10 minutes, and is preferably in the range of about 1 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 12 to about 70, and is preferably about 14 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes. The melt flow ratio is in the range of about 30 to about 150, and is preferably in the range of about 35 to about 145. The molecular weight of the final product is, generally, in the range of about 90,000 to about 450,000. The density of the blend can be at least 0.910 gram per cubic centimeter, and is preferably in the range of 0.916 to 0.960 gram per cubic centimeter.

The blend has a broad molecular weight distribution which can be characterized as bimodal. The broad molecular weight distribution is reflected in an Mw/Mn ratio of about 4 to about 40, preferably about 6 to about 30. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 30:70 to about 80:20, and is preferably in the range of about 40:60 to about 60:40. This is also known as the split.

The transition metal based catalyst system, ethylene, alpha-olefin, and, optionally, hydrogen are continuously fed into the first reactor; the polymer/active catalyst mixture is continuously transferred from the first reactor to the second reactor; ethylene and, optionally, alpha-olefin, hydrogen, and cocatalyst are continuously fed to the second reactor. The final product is continuously removed from the second reactor.

In the low melt index, as reflected in flow index, reactor, preferably the first reactor:

The mole ratio of alpha-olefin to ethylene can be in the range of about 0.01:1 to about 0.4:1, and is preferably in the range of about 0.02:1 to about 0.35:1. The mole ratio of hydrogen (if used) to ethylene can be in the range of about 0.001:1 to about 0.3:1, and is preferably in the range of about 0.017:1 to about 0.18:1. The operating temperature in the first reactor was discussed above in relation to the dew point of the recycle gas introduced into the first reactor. Preferred operating temperatures vary depending on the density desired, i.e., lower temperatures for lower densities and higher temperatures for higher densities provided that the dew point requirement is met.

In the high melt index reactor, preferably the second reactor:

The mole ratio of alpha-olefin (optional) to ethylene can be in the range of about 0.005:1 to about 0.6:1, and is preferably in the range of about 0.01:1 to about 0.42:1. The mole ratio of hydrogen (optional) to ethylene can be in the range of about 0.01:1 to about 3:1, and is preferably in the range of about 0.5:1 to about 2.2:1. The operating temperature is generally in the range of about 70° C. to about 110° C. As mentioned above, the temperature is preferably varied with the desired density. There is no dew point requirement in this reactor.

The pressure is generally the same in both the first and second reactors. The pressure, i.e., the total pressure in the reactor, can be in the range of about 200 to about 450 psi and is preferably in the range of about 280 to about 400 psig. The ethylene partial pressure in the first reactor was also discussed above in relation to the dew point requirement. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in each fluidized bed can be in the range of about 1 to about 12 hours and is preferably in the range of about 2 to about 5 hours.

The reactors can be run in the condensing mode, if desired. The condensing mode is described in U.S. Pat. Nos. 4,543,399 and 4,588,790.

The resin blend can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The advantage of the invention is found in the increase in catalyst activity in the second reactor. This increase is far more significant from an economic standpoint than an increase in the catalyst activity in the first reactor because the catalyst activity in the second reactor is the controlling parameter in determining the overall catalyst productivity of the staged reactor system. It is found that the process of this invention can increase the overall catalyst productivity by about a factor of two or more. Thus, an increase in catalyst activity in the second reactor significantly increases the overall productivity of the catalyst, and, in turn, reduces manufacturing costs. Another advantage is the reduction of residual catalyst metals such as titanium or other transition metal.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents and patent applications mentioned in this specification are incorporated by reference herein.

The invention is illustrated by the following examples.

EXAMPLES 1 TO 4

A titanium trichloride catalyst precursor is prepared in a 600 liter vessel equipped with pressure and temperature controls, and a turbine agitator. A nitrogen atmosphere (less than 5 ppm $H_2O$) is maintained at all times.

460 liters of anhydrous THF (less than 40 ppm $H_2O$) are added to the vessel, followed by 18.7 kilograms of anhydrous (less than 100 ppm $H_2O$) magnesium dichloride (196 mols) and 7.67 kilograms of $TiCl_3 \cdot \frac{1}{3} AlCl_3$ (3805 mols $TiCl_3$). The pressure of the mix tank is increased to 140 millimeters mercury and the mixture is agitated and heated at 80 degrees C. for 4 to 6 hours to dissolve the magnesium and titanium compounds. The mixture is filtered through a 100 micron filter to remove undissolved magnesium chloride(less than 40.5 weight percent).

500 grams of porous silica dehydrated to 600 degrees C., and optionally treated with 4 to 8 weight percent TEAL (triethylaluminum), are added to the above solution and stirred for 2 hours at 80 degrees C. and 1200 millimeters mercury. The mixture is dried by reducing pressure and allowing the excess THF to flash. The resulting catalyst precursor is a dry free flowing powder having the particle size of the silica. The adsorbed precursor has the following formula:

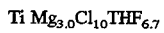

$Ti\ Mg_{3.0}Cl_{10}THF_{6.7}$

Ethylene is copolymerized with 1-hexene in each of two fluidized bed reactors. Each polymerization is continuously conducted after equilibrium is reached under conditions set forth in the Table. Polymerization is initiated in the first reactor by continuously feeding the above catalyst precursor and cocatalyst triethylaluminum (TEAL) into a fluidized bed of polyethylene granules together with ethylene, 1-hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene; and hydrogen are introduced into the second reactor where the gases come into contact with the copolymer and catalyst from the first reactor. Additional cocatalyst is also introduced. The product blend is continuously removed.

EXAMPLES 5 AND 6

Indene (0.480 g, 4.14 mmole) and zirconium tetra (diethylamide) (0.650 g, 1.72 mmole) are reacted at 86 degrees C. for 1.5 hours under nitrogen. The reaction product is subjected to distillation at 165 degrees C./0.02 millimeters Hg yielding a clear yellow, viscous liquid.

Mass spectroscopy showed parent ions at about 421 M/Z (several peaks due to the Zr isotopes). The cracking pattern is as expected from this molecule. The $^{13}C$-NMR (in $d_8$-dioxane) showed a series of aromatic resonances in the ratio of 2:2:2:1, plus ethyl multiplets $CH_2(-12)$, $CH_3(-18)$. This establishes the structure:

$Zr[N(CH_2CH_3)_2]_3$

The above distilled product is reacted, at atmospheric pressure, with carbon dioxide in a molar ratio of carbon dioxide to zirconium of 3:1 for 1 hour followed by reaction with methylaluminoxane to form the catalyst.

In addition to variable polymerization conditions, resin properties are given in the following Table for examples 1 to 6.

TABLE

| reaction conditions | reactor one | reactor two | reactor one | reactor two |
|---|---|---|---|---|
| | example 1 | | example 2 | |
| pressure (psig) | 315 | 355 | 315 | 355 |
| temperature (degrees C.) | 85 | 110 | 85 | 110 |
| dew point (degrees C.) | 30 | — | 82 | — |
| C2 partial pressure (psia) | 33 | 88 | 29.1 | 88 |
| isopentane concentration (mol percent) | 0 | 0 | 20.4 | 2.6 |
| bed weight (pounds) | 110 | 100 | 110 | 100 |
| production rate (pounds per hour) | 32 | 21 | 32 | 21 |
| residence time (hours) | 3.4 | 1.9 | 3.4 | 1.9 |
| resin properties | | | | |
| flow index | 0.45 | 8 | 0.45 | 8 |
| density (g/cc) | 0.93 | 0.948 | 0.93 | 0.948 |
| titanium (ppm) | 17.5 | 10.5 | 9.8 | 6.3 |
| catalyst productivity reaction | 1430 | 2380 | 2551 | 3970 |

TABLE-continued

| conditions | reactor one | reactor two | reactor one | reactor two |
|---|---|---|---|---|
| | example 3 | | example 4 | |
| pressure (psig) | 280 | 315 | 280 | 315 |
| temperature (degrees C.) | 85 | 110 | 74 | 110 |
| dew point (degrees C.) | 55 | — | 70 | — |
| C2 partial pressure (psia) | 25 | 92 | 23.1 | 76 |
| hexane concentration (mol percent) | 3 | 0 | 6 | 0 |
| bed weight (pounds) | 52000 | 60000 | 43000 | 53000 |
| production rate (pounds per hour) | 16900 | 12100 | 11500 | 8000 |
| residence time (hours) | 3.1 | 2.1 | 3.7 | 2.7 |
| resin properties | | | | |
| melt flow index (grams per 10 minutes) | 0.45 | 8 | 0.45 | 8 |
| density (g/cc) | 0.93 | 0.948 | 0.93 | 0.948 |
| titanium (ppm) | 18.1 | 11.7 | 6.5 | 3.9 |
| catalyst productivity | 662 | 1025 | 1850 | 3080 |
| reaction conditions | example 5 | | example 6 | |
| pressure (psig) | 280 | 350 | 280 | 350 |
| temperature (degrees C.) | 70 | 80 | 70 | 80 |
| dew point (degrees C.) | 55 | — | 70 | — |
| C2 partial pressure (psia) | 200 | 250 | 150 | 190 |
| hexane concentration (mol percent) | 3 | 0 | 6 | 0 |
| bed weight (pounds) | 80 | 120 | 80 | 120 |
| production rate (pounds per hour) | 40 | 10 | 40 | 10 |
| residence time (hours) | 2 | 2.1 | 2 | 2.7 |
| resin properties | | | | |
| melt index (grams per 10 minutes) | 1.2 | 2 | 1.2 | 2 |
| density (g/cc) | 0.927 | 0.930 | 0.927 | 0.930 |
| zirconium (ppm) | 1.5 | 1.2 | 0.8 | 0.65 |
| catalyst productivity | 3500 | 4375 | 6500 | 8200 |

Notes to above Table:

1. Dew point is the dew point of the cycle gas.

2. Resin properties for second reactor: these are properties of the final product.

3. Melt flow index is determined under ASTM D-1238, Condition E. It is measured at 190 degrees C. and 2.16 kilograms, and reported in grams per 10 minutes.

3. Density is measured by producing a plaque in accordance with ASTM D-1928, procedure C, and then testing as is via ASTM D-1505. The density is reported in gram per cubic centimeter.

4. Catalyst productivity is the number of pounds of polyethylene produced per pound of dry catalyst.

We claim:

1. A process comprising contacting recycle gas containing ethylene and at least one alpha-olefin comonomer having 3 to 8 carbon atoms with a transition metal based catalyst system in two fluidized bed reactors connected in series, in the gas phase, under polymerization conditions, with the provisos that:

(a) the first reactor is operated at a temperature at or above the dew point of the recycle gas, but no higher than about 5 degrees C. above said dew point;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) in the reactor in which a low melt index copolymer is made:

(1) the alpha-olefin is present in a ratio of about 0.01 to about 0.4 mol of alpha-olefin per mol of ethylene; and (2) optionally, hydrogen is present in a ratio of about 0.001 to about 0.3 mol of hydrogen per mol of ethylene; and (e) in the reactor in which a high melt index polymer is made:

(1) optionally, alpha-olefin is present in a ratio of about 0.005 to about 0.6 mol of alphaoolefin per mol of ethylene; and (2) optionally, hydrogen is present in a ratio of about 0.001 to about 3 mols of hydrogen per mol of ethylene.

2. The process defined in claim 1 wherein the transition metal catalyst system is a magnesium/titanium catalyst system or a metallocene catalyst system.

3. The process defined in claim 1 wherein the copolymer formed in one reactor has a flow index in the range of about 0.01 to about 50 grams per 10 minutes and a density in the range of about 0.860 to about 0.940 gram per cubic centimeter and the polymer formed in the other reactor has a melt index in the range of about 5 to about 3000 grams per 10 minutes and a density in the range of about 0.900 to about 0.975 gram per cubic centimeter, the weight ratio of the high molecular weight copolymer to the low molecular weight polymer being in the range of about 30:70 to about 80:20.

4. The process defined in claim 3 wherein the blend has a melt index in the range of about 0.02 to about 3.5 grams per 10 minutes; a melt flow ratio in the range of about 30 to about 150; and a density in the range of 0.910 to 0.960 gram per cubic centimeter.

5. The process defined in claim 3 wherein the blend is produced under the following conditions:

in the one reactor:

(1) the alpha-olefin is 1-hexene and is present in a ratio of about 0.02 to about 0.35 mol of alpha-olefin per mol of ethylene;

(2) hydrogen is present in a ratio of about 0.017 to about 0.18 mol of hydrogen per mol of ethylene; and (3) the temperature is in the range of about 60 to about 100 degrees C.; and in the other reactor:

(1) the alpha-olefin is 1-hexene or 1-butene and is present in a ratio of about 0.01 to about 0.42 mol of alpha-olefin per mol of ethylene; and (2) hydrogen is present in a ratio of about 1.7 to about 2.2 mols of hydrogen per mol of ethylene.

6. The process defined in claim 5 wherein the blend has a melt index in the range of about 0.04 to about 2.0 grams per 10 minutes; a melt flow ratio in the range of about 35 to about 145; and a density in the range of 0.916 to 0.960 gram per cubic centimeter.

7. A gas phase process for the production of a polyethylene blend wherein the polymer formed in the first reactor is a copolymer of ethylene, 1-hexene, and, optionally, one or more other up to 8 carbon atom alpha-olefins having a flow index in the range of about 0.2 to about 12 grams per 10 minutes and a density in the range of about 0.890 to about 0.940 gram per cubic centimeter and the polymer formed in the second reactor is a copolymer of ethylene, 1-butene or 1-hexene, and, optionally, one or more other up to 8 carbon atom alpha-olefins having a melt index in the range of about 7 to about 1000 grams per 10 minutes and a density in the range of about 0.910 to about 0.975 gram per cubic centimeter, the weight ratio of first reactor polymer to second reactor polymer being in the range of about 40:60 to about 60:40, comprising contacting a recycle gas containing ethylene and the aforementioned alpha-olefins with a transition metal based catalyst system in two fluidized bed reactors connected in series, under polymerization conditions, with the provisos that:

(a) the first reactor is operated at a temperature at or above the dew point of the recycle gas, but no higher than about 5 degrees C. above said dew point;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) in the first reactor:

(1) the alpha-olefin is present in a ratio of about 0.02 to about 0.35 mol of alpha-olefin per mol of ethylene;

(2) hydrogen is present in a ratio of about 0.017 to about 0.18 mol of hydrogen per mol of ethylene; and (3) the temperature is in the range of about 70 to about 90 degrees C.; and (e) in the second reactor:

(1) the alpha-olefin is present in a ratio of about 0.01 to about 0.42 mol of alpha-olefin per mol of ethylene; and (2) hydrogen is present in a ratio of about 0.5 to about 2.2 moles of hydrogen per mole of ethylene.

8. The process defined in claim 7 wherein the transition metal catalyst system is a magnesium/titanium catalyst system or a metallocene catalyst system.

9. The process defined in claim 2 wherein the metallocene catalyst system includes a precursor and an aluminoxane cocatalyst, said precursor having the following formula:

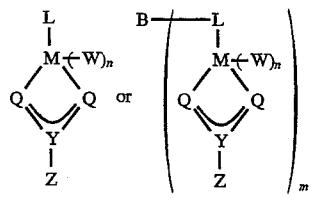

wherein:

M is Zr or Hf;

L is a substituted or unsubstituted, π-bonded ligand;

Q can be the same or different and is independently selected from the group consisting of —O—, —NR—, —CR$_2$— and —S—;

Y is either C or S;

Z is selected from the group consisting of —OR, —NR$_2$, —CR$_3$, —SR, —SiR$_3$, —PR$_2$ and —H, with the proviso that when Q is —NR— then Z is selected from the group consisting of —OR, —NR$_2$, —SR, —SiR$_3$, —PR$_2$ and —H;

n is 1 or 2;

W is a univalent anionic group when n is 2 or W is a divalent anionic group when n is 1;

R can be the same or different and is independently a group containing carbon, silicon, nitrogen, oxygen, and/or phosphorus and one or more R groups may optionally be attached to the L substituent;

B is a bridging group selected from the group consisting of an alkylene or arylene group containing from 1 to 10 carbon atoms, germanium, silicone and alkyl phosphine; and m is 2 to 7.

* * * * *